UNITED STATES PATENT OFFICE.

RUDOLF WEYERMANN, OF BAMBERG, GERMANY.

PROCESS OF REMOVING THE BITTER TASTE FROM MALT EXTRACTS.

1,105,119.

Specification of Letters Patent. Patented July 28, 1914.

No Drawing. Application filed March 4, 1914. Serial No. 822,506.

*To all whom it may concern:*

Be it known that I, RUDOLF WEYERMANN, a subject of the German Empire, and residing at Bamberg, Bavaria, Germany, have invented a certain new and useful Improved Process of Removing the Bitter Taste from Malt Extracts, of which the following is a specification.

The subject-matter of my invention is an improved process of removing the bitter taste from malt extracts of all kinds having the important advantage that these extracts can have removed from them in a relatively simple and very effective manner all the bitter substances which are adapted to impart to the extracts themselves or to the beers to be made therefrom a taste disagreeable to many consumers.

The hereindescribed process is specially important for extracts made from so-called colored malt. These colored malts and the extracts made from them are used, as is well known, for imparting to certain kinds of beer the more or less dark brown color which is such a favorite with many consumers. These colored malts always contain substances which have a burnt taste and impart to the beer a bitter and rough taste. These constituents of the malt, obviously products of dry distillation of legumes, particularly influence the taste of very dark beers, e. g., Kulmbacher beer, very considerably.

A process of caramelizing sugar and the like is already well known consisting in heating the substances to be caramelized in an open or closed vessel and simultaneously admitting steam, air or oxygen or a mixture of these gases; the substances which are formed during the caramelizing process and which owe their existence to the decomposition of the sugar are partly removed and, if desired, collected for further employment. In this known process the specific action of steam does not come into question, because air or oxygen may be used instead of steam. The essence of the process consists in performing the caramelization with the coöperation of steam, air or oxygen.

As mentioned above products which are chemically allied to the volatile oils and have an exceedingly pungent disagreeable taste and odor are formed during the manufacture of very dark colored malts, particularly from the constituents of the hulls, presumably principally from the rosinous substances contained therein. These undesirable constituents were formerly removed from the colored malt extracts by filtration over animal charcoal. I have found that it is possible to remove these substances in a much simpler and more effective manner by treating the malt extract with steam; this treatment is effected by conducting steam through the wort in question, as, for example, the colored malt wort made by mashing colored malt with dried malt, or through colored beers or the like, it being found that the steam takes away the undesirable substances having the disagreeable odor and taste. The goods are simultaneously heated in known manner by indirect steam. It is thus attained that the beers made by using the extracts treated in this manner have the desired dark color and a taste which is much better than that of all similar beers known heretofore.

I claim:—

1. A process of removing constituents having a bitter taste from malt wort, which consists in indirectly heating the wort to be treated and simultaneously passing steam through the wort.

2. A process of removing from colored malt wort constituents having a bitter taste and an offensive odor, consisting in passing steam through the wort while simultaneously heating the same by indirect steam.

In testimony whereof, I affix my signature in the presence of two witnesses.

RUDOLF WEYERMANN.

Witnesses:
ERNST CANTAD,
OSCAR BOCK.